United States Patent
Chung et al.

(10) Patent No.: US 11,906,780 B2
(45) Date of Patent: Feb. 20, 2024

(54) ASYMMETRIC ADIABATIC POLARIZATION BEAM SPLITTER AND INTEGRATED OPTICAL WAVEGUIDE FILTERING CHIP

(71) Applicant: NATIONAL CENTRAL UNIVERSITY, Taoyuan (TW)

(72) Inventors: Hung-Pin Chung, New Taipei (TW); Kuang-Hsu Huang, Kaohsiung (TW); Tsung-Yeh Ho, Taipei (TW); I-Ting Chung, Taoyuan (TW); Yen-Hung Chen, Taoyuan (TW)

(73) Assignee: National Central University, Taoyuan (TW)

( * ) Notice: Subject to any disclaimer, the term of this patent is extended or adjusted under 35 U.S.C. 154(b) by 96 days.

(21) Appl. No.: 17/510,944

(22) Filed: Oct. 26, 2021

(65) Prior Publication Data

US 2023/0096413 A1 Mar. 30, 2023

(30) Foreign Application Priority Data

Sep. 29, 2021 (TW) .................................. 110136210

(51) Int. Cl.
*G02B 6/126* (2006.01)
*G02B 5/20* (2006.01)
*G02B 27/28* (2006.01)

(52) U.S. Cl.
CPC ............. *G02B 6/126* (2013.01); *G02B 5/207* (2013.01); *G02B 27/283* (2013.01)

(58) Field of Classification Search
CPC .... G02B 6/126; G02B 6/2773; G02B 6/1228; G02B 6/2726; G02B 27/283; G02B 5/207
See application file for complete search history.

(56) References Cited

U.S. PATENT DOCUMENTS 5,133,029 A * 7/1992 Baran ..................... G02B 6/126
359/489.08
6,850,665 B2 2/2005 Grubsky et al.
(Continued)

FOREIGN PATENT DOCUMENTS

WO  WO-2016052343 A1 *  4/2016 ............. G02B 6/122
WO  WO-2016141478 A1 *  9/2016 ......... G02B 6/12002

OTHER PUBLICATIONS

Chung, et al. "Adiabatic Light Transfer in Titanium Diffused Lithium Niobate Waveguides." Optics Express, vol. 23, No. 24, pp. 30641-30650 (Nov. 30, 2015). https://doi.org/10.1364/OE.23.030641.
(Continued)

*Primary Examiner* — Thomas A Hollweg
*Assistant Examiner* — Mary A El-Shammaa
(74) *Attorney, Agent, or Firm* — Rosenberg, Klein & Lee

(57) ABSTRACT

An asymmetric adiabatic polarization beam splitter integrated with a waveband filtering splitter unit and a polarization filtering splitter unit is capable of being packaged to form an integrated optical waveguide filtering chip. The waveband filtering splitter unit utilizes an adiabatic optical waveguide structure and stimulated Raman adiabatic passage on an optical waveguide to split the energy of light sources of different bands to different spaces when the light energy is performed with an adiabatic process. The polarization filtering splitter unit utilizes the two orthogonal polarization modes of an optical waveguide with birefringence to achieve a polarization-dependent mode splitting effect based on an adiabatic theory. The asymmetric adiabatic polarization beam splitter realizes the characteristics of integration and high process tolerance, and improves the mass production feasibility.

18 Claims, 6 Drawing Sheets

(56) References Cited

U.S. PATENT DOCUMENTS

| | | |
|---|---|---|
| 6,885,794 B2 | 4/2005 | Scheuer et al. |
| 6,950,581 B2 | 9/2005 | Bandyopadhyay |
| 8,855,449 B1 | 10/2014 | Roth |
| 9,523,820 B1 | 12/2016 | Vermeulen |
| 9,759,862 B1 | 9/2017 | Derose et al. |
| 9,874,692 B2 | 1/2018 | Oka |

OTHER PUBLICATIONS

Chung, et al. "Broadband On-Chip Polarization Mode Splitters in Lithium Niobate Integrated Adiabatic Couplers." Optics Express, vol. 27, No. 2, pp. 1632-1645 (Jan. 21, 2019). https://doi.org/10.1364/OE.27.001632.

Search Report dated Mar. 29, 2022, By Taiwan Patent Office in Application No. 110136210.

\* cited by examiner

ASYMMETRIC ADIABATIC POLARIZATION BEAM SPLITTER AND INTEGRATED OPTICAL WAVEGUIDE FILTERING CHIP

BACKGROUND

Technical Field

The present disclosure relates to a polarization beam splitter, and in particular, an asymmetric adiabatic polarization beam splitter integrated with a waveband filtering splitter unit and a polarization filtering splitter unit, wherein the asymmetric adiabatic polarization beam splitter can be packaged to form an integrated optical waveguide filtering chip by using a packaging structure.

Related Art

Optical couplers have always played an important role in the use of light wave signal processing and light filtering and splitting. The conventional optical coupler is a directional coupler component, and its main structure has two parallel optical waveguides. When the distance between two parallel optical waveguides is close enough, based on the theory of evanescent wave coupling, the mode-field distributions of the two optical waveguides will coincide with each other in space. When phases of the two optical waveguides match with each other, the light wave energy under specific conditions can be perfectly coupled from one optical waveguide to the other optical waveguide to complete the purpose of light filtering and splitting. However, the light splitting manner of the directional coupler is very sensitive to variables of a chip working temperature, a waveguide mode and an optical band. The structure of the directional coupler component described above can usually only achieve a perfect energy transfer result for light waves under specific conditions, and it is relatively susceptible to process errors on the optical waveguide structure, which affects the achieved light splitting ratio. Simply put, if the design of the above-mentioned optical waveguide structure is defective, it will result in a very low tolerance for the directional coupler process of the dual-parallel waveguide, and at the same time increase the difficulty in mass production and result a relatively low yield.

U.S. Pat. No. 6,950,581 B2 illustrates a solution of an optical waveguide structure. Two additional side optical waveguide structures are added to the outer sides of the parallel waveguide area in the conventional dual parallel directional coupler, so that when the two main optical waveguides are coupled in the working region, the energy is coupled to the side optical waveguide for storage. At the end, the energy is coupled back to the main optical waveguide. Through the above-mentioned design manner, the sensitivity of the directional coupler to the geometric structure of the optical waveguide can be reduced, and the process tolerance and manufacturing convenience can be improved. However, if part of the energy is left in the side optical waveguide, part of the energy cannot be returned to the main optical waveguide structure, resulting in increased optical loss of the component. Furthermore, the design of the above-mentioned optical waveguide structure still uses the conventional directional coupling structure as the main light coupling principle, so it cannot substantially solve the narrow frequency band characteristics of the directional coupler and cannot avoid the problem of sensitivity to operating temperature.

On the other hand, in terms of polarization-dependent light splitting design, U.S. Pat. No. 8,855,449 B1 provides a multiple optical waveguide structure design solution for integrated light polarization filtering chip. This light polarization filtering chip uses the optical waveguide geometric structure design for the incident light wave of arbitrary polarization, so that the mode has the effect of polarization rotation during the transmission process, and adopts the gradual optical waveguide structure to meet the adiabatic condition for reducing optical loss of the polarization mode coupling. The light wave of the polarization rotation is then coupled to the exit of the specific optical waveguide to complete the polarization filtering and light splitting. However, a multilayer optical waveguide structure must be used in the above-mentioned chip design, which has a two-layer material structure in the vertical direction. Each of the upper layer and the bottom layer has a waveguide layer formed of different material dielectrics to complete the vertical optical path coupling structure. The multilayer optical waveguide structure also combines the horizontal waveguide structure design to guide the light wave to the specific waveguide exit. Simply put, this technical solution uses three-dimensional multiple structures and multiple dielectric material designs, so the overall optical waveguide structure will be complicated, leading to difficulties in mass production and manufacturing process, and if the design is not careful, the coupling process between heterogeneous material waveguides easily causes a large optical loss, so this technical solution has a great dependence on high advance process technology.

U.S. Pat. No. 9,759,862 B1 provides an optical waveguide width changing structure design of an integrated light polarization filtering chip. This manner greatly simplifies the design of the optical waveguide structure, which changes the optical waveguide width in the light wave transmission direction. Due to the influence of the geometric structure of the optical waveguide, the difference between refractive indices corresponding to the transverse electric mode and the transverse magnetic mode changes. By using this difference to design the optical splitting structure conditions, the light wave with only a single polarization state can be coupled to another optical waveguide. Adding a gradual structure of optical waveguide width to the directional coupler can not only satisfy the adiabatic condition, but also achieve a high polarization extinction ratio. However, the multi-stage optical waveguide width change will cause inconvenience in the simulation design and manufacturing process, and the difference in the width of the nanometer size will cause the component characteristics of the polarization extinction ratio to rapidly deteriorate. Simply put, this technical solution needs to rely on high-precision process technology.

On the other hand, U.S. Pat. No. 9,874,692 B2 provides a parallel optical waveguide oblique structure design of the integrated light polarization filtering chip, and its structure is similar to the technical solution of U.S. Pat. No. 9,759,862 B1. In the technical solution of U.S. Pat. No. 9,874,692 B2, two parallel optical waveguide structures adopt oblique gradual changes in the optical waveguide width to subtly reduce the complexity of the multi-stage optical waveguide width design, and retain key parameter adjustment and design space, so as to achieve the function of polarization filtering and light splitting. However, the width change design on the main transmission optical waveguide will cause the mode-field continuously to change and become unstable during the transmission process, and it is easy to increase the optical loss. In addition, under different optical wavebands, the above-mentioned mode-field changes will make the result of the polarization filter and light splitting more unstable. Moreover, because the above-mentioned optical waveguide structure size design is still at the nanometer level, it is still unable to get rid of dependence on high advance manufacturing processes.

In terms of band filtering, most patented designs select specific wavelengths for filtering in use, which results in only narrow band filtering characteristics. For example, U.S. Pat. No. 6,885,794 B2, which uses a miniature ring-shaped resonant cavity structure, allows light waves of a specific wavelength to meet the resonance conditions, and is coupled to another optical waveguide to complete the filtering component function. Furthermore, there are also technical solutions that add grating design to the optical waveguide structure, for example, U.S. Pat. No. 6,850,665 B2, which uses a variety of grating structure designs to meet the filtering conditions. Both of the grating structure and the resonant cavity structure need to meet specific phase matching conditions in order to efficiently achieve the functional purpose of light energy coupling. However, because specific phase matching conditions usually require strict definition of specific operating optical bands and component operating temperature ranges, the above-mentioned structure cannot substantially meet the functional requirements of achieving broadband filtering under different operating temperatures.

In the broadband filtering chip design, an N-type optical waveguide structure can be used to complete the design. A third oblique optical waveguide is added to two parallel optical waveguides. The third optical waveguide functions as a communication bridge between two parallel optical waveguides. Based on the principle of stimulated Raman adiabatic passage (STIRAP), the light wave is perfectly coupled to another optical waveguide. This structure can effectively simplify the design of the optical waveguide structure, and solve effect of the aforementioned change of the optical waveguide mode, so as to reduce the optical loss caused during the mode change. On the other hand, this optical waveguide structure has the unique optical characteristics of broadband filtering, which can filter and split the light sources of different wavebands, and the design of the critical dimensions of the optical waveguide only requires micron-level process requirements, so there is a greater degree of process error tolerance. The good tolerance also greatly reduces the demand for high advance processes and process costs. For the related principles and applications of the above technical solutions, please refer to the public document "Adiabatic light transfer in titanium diffused lithium niobate waveguides", Chung, H. P., et al., Optics express 23.24 (2015): 30641-30650.

The above-mentioned N-type optical waveguide structure can be further improved to develop a light polarization splitting coupler unit. Through the geometric design of the optical waveguide structure and the birefringence characteristics of the material itself, that is, the difference between refractive indices corresponding to the transverse electric mode and the transverse magnetic mode, the light waves of two orthogonal polarization directions can have different splitting response conditions in the same optical waveguide structure. In this way, light waves with a specific polarization direction can be coupled to another waveguide to complete the component function of polarization filtering and light splitting. This technical solution combined with the above-mentioned N-type optical waveguide structure can be integrated as a quantum light source filtering chip. For details, please refer to the public document "Broadband on-chip polarization mode splitters in lithium niobate integrated adiabatic couplers", Chung, Hung-Pin, et al., Optics express 27.2 (2019): 1632-1645.

Unfortunately, in the above-mentioned chip structure design, the serial arrangement design of the light filtering and splitting unit is based on the intermediate optical waveguide as the non-main waveband filtering optical waveguide, so it is easy to receive unnecessary light signals at the exit end, which causes noise interference on the measurement signal, and also lead to the difficulty of spatially connecting filter units in series to improve component characteristics.

In conventional optical systems, although free space light sources can be used with lens sets and various optical elements to complete the required process functions of band filtering and light splitting, this manner usually requires a large range of construction space. Furthermore, discrete optical components are not only expensive, but also require a lot of time for component adjustment. In contrast, the main function of the integrated optical chip is to integrate the functions of various optical components and integrate them on a tiny chip, so that the size of the optical components and the construction cost of the optical system can be greatly reduced. For different optical system requirements, integrated optical waveguide chips with corresponding functions can also be configured exclusively. Therefore, it is necessary to design a technical solution for an integrated optical waveguide filtering chip that can solve the measurement interference and space configuration problems faced by the previous chip.

SUMMARY

According to at least one objective of the present disclosure, the preset disclosure provides an asymmetric adiabatic polarization beam splitter, comprising: an optical substrate, having a first side, a second side opposite to the first side, a third side and a fourth side opposite to the third side, wherein the third side and the fourth side are adjacent to the first side and the second side, and from the first side to the second side, sequentially having a first featured region, a second featured region, a third featured region, a fourth featured region and a fifth featured region; a first optical waveguide, a second optical waveguide and a third optical waveguide, formed on the optical substrate and extend from the first side to the second side, wherein from the third side to the fourth side, there are sequentially the first optical waveguide, the second optical waveguide and the third optical waveguide; a band filtering structure, formed on the optical substrate, located in the second featured region and between the first optical waveguide and the second optical waveguide, used to guide a first specific band light source in the first optical waveguide into the second optical waveguide; and a polarization filtering structure, formed on the optical substrate, located in the fourth featured region and between the second optical waveguide and the third optical waveguide, used to guide a first polarization direction light source in the second optical waveguide into the third optical waveguide.

In one embodiment of the present disclosure, the first optical waveguide, the second optical waveguide and the third optical waveguide are arranged in parallel with each other.

In one embodiment of the present disclosure, the optical substrate is a silicon-based material substrate, a III-V material substrate, a silicon substrate, a sapphire substrate, a ceramic substrate, a quartz substrate, a lithium niobate substrate, a lithium tantalate substrate or a potassium titanyl phosphate substrate.

In one embodiment of the present disclosure, each of the first optical waveguide, the second optical waveguide and the third optical waveguide is a channel waveguide, a diffused waveguide, a ridge waveguide or a buried waveguide.

In one embodiment of the present disclosure, the first featured region is a transition buffer region before a light source of the first optical waveguide enters the second featured region, the third featured region is used to help stabilize the optical waveguide mode of the first specific band light source in the second optical waveguide, and the fifth featured region is used to make a second specific band light source of the first optical waveguide, a second polarization direction light source of the second optical waveguide and the first polarization direction light source of third optical waveguide output outside.

In one embodiment of the present disclosure, the first optical waveguide in the second featured region has a tapered structure with a waveguide width being gradually decreased in an extending direction from the first side to the second side, and the second optical waveguide in the second featured region is a reverse tapered structure with a waveguide width being gradually increased in the extending direction from the first side to the second side.

In one embodiment of the present disclosure, the band filtering structure is a band filtering waveguide, the band filtering waveguide is a channel waveguide, a diffused waveguide, a ridge waveguide or a buried waveguide, and the band filtering structure gradually departs away from the second optical waveguide and gradually approaches the first optical waveguide in an extending direction from the first side to the second side.

In one embodiment of the present disclosure, the polarization filtering structure comprises at least three polarization filtering waveguides, the polarization filtering waveguide is a channel waveguide, a diffused waveguide, a ridge waveguide or a buried waveguide, and the polarization filtering structure gradually departs away from the third optical waveguide and gradually approaches the second optical waveguide in an extending direction from the first side to the second side.

In one embodiment of the present disclosure, the first polarization direction light source is a polarization light source of transverse electric.

According to at least one objective of the present disclosure, the present disclosure further provides an integrated optical waveguide filtering chip, comprising: one of the above-mentioned asymmetric adiabatic polarization beam splitters; and a packaging structure, used to package the asymmetric adiabatic polarization beam splitter to form the integrated optical waveguide filtering chip.

In summary, the main purpose of the present disclosure is to provide a structural design solution for the asymmetric adiabatic polarization beam splitter of the integrated optical chip with multiple filtering functions, so as to directly use a single chip to complete the preparation of the light source with a certain state. Different from the prior art, the present disclosure uses a special series connection structure combination design according to the light source processing processes of the light filtering and splitting units to modularize the functions of each light filtering and splitting unit to reduce the design difficulties of the waveband filtering splitter unit and polarization filtering splitter unit. The present disclosure performs filtering on non-main band light sources, so it can effectively reduce noise interference. Further, the present disclosure separates the main band light source and non-main band light source in the horizontal spatial separation filtering manner. Therefore, multiple groups of the light filtering and splitting units can be connected in series, thereby greatly improving the functional characteristics of filtering.

Simply put, the asymmetric adiabatic polarization beam splitter of the integrated optical waveguide filtering chip of the present disclosure integrates the waveband filtering splitter unit and the polarization filtering splitter unit in a series connection, so that a single chip can complete functions of waveband filtering and polarization filtering, and since the integrated optical waveguide filtering chip integrates optical function components, so that it greatly reduce the component size and the construction cost of the optical system.

BRIEF DESCRIPTIONS OF DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings. All of the drawings of the present disclosure are listed and briefly described as follows.

DETAILED DESCRIPTIONS OF EXEMPLARY EMBODIMENT

Figure 1:
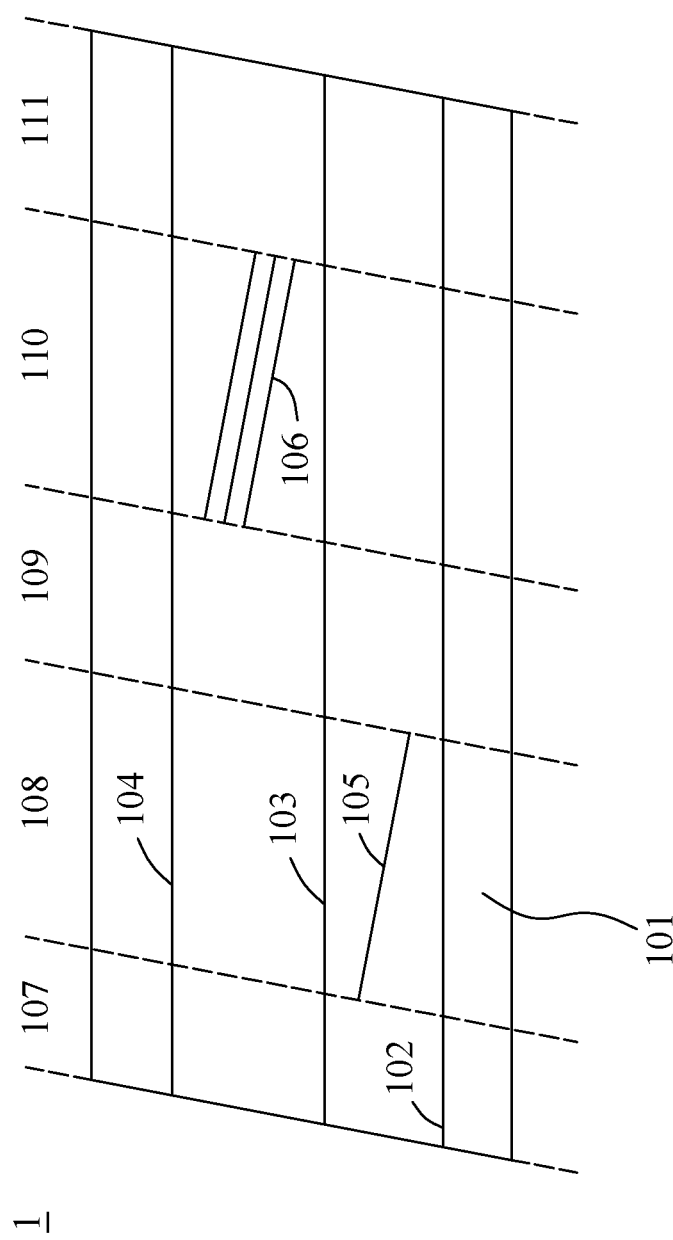
FIG. 1 is a schematic diagram showing a structure of an asymmetric adiabatic polarization beam splitter in an integrated optical waveguide filtering chip according to one embodiment of the present disclosure.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims.

The integrated optical waveguide filtering chip of the present discourage can be used as the integrated light polarization splitting and band filtering chip of the quantum light source system, and can solve the measurement interference and space configuration problems faced by the integrated optical chip of the prior art. According to the light source processing processes of the light filtering and splitting units, the present disclosure uses a special series connection structure combination design to provide a design solution of an integrated optical waveguide filtering chip and its asymmetric adiabatic polarization beam splitter.

The asymmetric adiabatic polarization beam splitter is an unpackaged integrated optical die comprising an integrated waveband filtering splitter unit and an integrated polarization filtering splitter unit. The integrated optical die is packaged via a packaging structure to form an integrated optical waveguide filtering chip. The waveband filtering splitter unit on the optical waveguide uses the principle of STIRAP and cooperates with the adiabatic optical waveguide structure on the substrate of the integrated optical die to make the light wave energy in the integrated optical die through adiabatic process achieves the purpose of splitting the energy of different optical bands in space. The aforementioned polarization filtering splitter unit utilizes the two modes of orthogonal polarization of the optical waveguide with birefringence. Through the above-mentioned adiabatic principle, the polarization-dependent spatial mode splitter function is achieved. Simply put, the asymmetric adiabatic polarization beam splitter integrates at least one set of adiabatic spatial filter units and at least one set of adiabatic polarization filter units to achieve a single integrated optical die that can split the light of different bands and optical polarization into different spaces. Accordingly, the present disclosure can realize the characteristics of integration and high process tolerance on a single integrated optical die, and improve the mass production feasibility. Because the asymmetric adiabatic polarization beam splitter of the present disclosure has broadband waveband filtering characteristics, the asymmetric adiabatic polarization beam splitter of the present disclosure can be widely used in a variety of light filtering scenarios, for example, it can be used as a quantum light source for the band and polarization filtering and light splitting purposes.

Different from the prior art, the present disclosure uses a special series connection structure combination design based on the light source processing process of the filtering splitter unit to modularize the function of each filtering splitter unit to reduce the design difficulty of the waveband filtering splitter unit and polarization filtering splitter unit. The present disclosure performs spatial filtering on the non-main waveband light source, so it can effectively reduce noise interference, and further uses the filtering method of horizontal spatial separation between the main waveband light source and the non-main waveband light sources, so it can extend to serially connect multiple groups of filtering splitter units in spaces to greatly improve the functional characteristics of spatial filtering of the integrated optical die.

Briefly, the present disclosure utilizes the principle of STIRAP, combined with a novel N-waveguide structure design, to achieve the required conditions for adiabatic energy conversion, and performs light wave energy coupling conversion on an optical waveguide. The present disclosure further develops the N-type waveguide design integrated with multiple optical functions of multiple optical components on a single integrated optical die, and achieves the purpose of light wave signal processing, thereby greatly reducing the size of the optical system and the construction cost. In particular, the present disclosure adopts a combination design of a special series connection structure to reduce the difficulty of designing the waveguide structure, and can effectively reduce the situation of noise interference, and can extend and connect multiple sets of filtering splitter units in series to greatly improve the functional characteristics of the spatial filtering of the chip.

Please note here that although the principles of band filtering and polarization filtering have been found in the literature, there is currently no document telling how to modify the principles of band filtering and polarization filtering in a series connection to implement both of them in a single integrated optical die, and there is no mention of how to design to improve the spatial filtering function of the single integrated optical die. Please further note here that the present disclosure uses the combination design of a special series connection structure of the waveband filtering splitter unit and the polarization filtering splitter unit to realize the functions of the band filtering splitter and the polarization filtering splitter in a single integrated optical die. Therefore, the present disclosure is not for those who simply combine or easily modify existing documents, and the present disclosure is not easily thought of. The specific details and descriptions will be described later in conjunction with the drawings.

Firstly, refer to FIG. 1, and FIG. 1 is a schematic diagram showing a structure of an asymmetric adiabatic polarization beam splitter in an integrated optical waveguide filtering chip according to one embodiment of the present disclosure. The asymmetric adiabatic polarization beam splitter 1 in the integrated optical waveguide filtering chip of the embodiment of the present disclosure is used as an integrated optical die, and after packaging, an integrated optical waveguide filtering chip can be formed. The asymmetric adiabatic polarization beam splitter 1 includes an optical substrate 101, a first optical waveguide 102, a second optical waveguide 103, a third optical waveguide 104, a band filtering structure 105 and a polarization filtering structure 106. From the first side (left side) to the second side (right side) of the optical substrate 101, there are the first featured region 107, the second featured region 108, the third featured region 109, the fourth featured region 110 and the fifth featured region 111. The first side of the optical substrate 101 is set opposite to the second side of the optical substrate 101 (that is, the above two sides are opposite sides). The optical substrate 101 may be a single substrate, or may be formed by splicing multiple substrates of different materials, and the present disclosure is not limited thereto.

The first optical waveguide 102, the second optical waveguide 103 and the third optical waveguide 104 are formed on the optical substrate 101 and extend from the first side to the second side of the optical substrate 101. The optical substrate 101 also has a third side (lower side) and a fourth side (upper side) opposite to each other. The third side and the fourth side of the optical substrate 101 are adjacent to the first side and the second side of the optical substrate 101. From the third side (lower side) to the fourth side (upper side) of the optical substrate 101, there are a first optical waveguide 102, a second optical waveguide 103, and a third optical waveguide 104 are sequentially arranged. Each of the first optical waveguide 102, the second optical waveguide 103 and the third optical waveguide 104 can be implemented by a channel waveguide, a diffused waveguide, a ridge waveguide, or a buried waveguide, and the present disclosure is not limited thereto.

In the second featured region 108, a band filtering structure 105 formed on the optical substrate 101 is arranged between the first optical waveguide 102 and the second optical waveguide 103. Thus, the first optical waveguide 102, the second optical waveguide 103 and the band filtering structure 105 of the second featured region 108 form waveband filtering splitter unit. In the fourth featured region 110, a polarization filtering structure 106 formed on the optical substrate 101 is arranged between the second optical waveguide 103 and the third optical waveguide 104. Thus, the second optical waveguide 103, the third optical waveguide 104 and the polarization filtering structure 106 of the fourth featured region 110 form a polarization filtering splitter unit.

The light source can be guided into the first optical waveguide 102 of the asymmetric adiabatic polarization beam splitter 1 of the integrated optical waveguide filtering chip through the first featured region 107, and the first featured region 107 is used as the transition buffer area of the light source before the light source enters the second featured region 108, so as to effectively help the optical waveguide of the light source to be stable.

The light source is transferred from the first featured region 107 to the second featured region 108 through the first optical waveguide 102, and the band filtering structure 105 can guide the light source of the specific band in the first optical waveguide 102 (for example, the first specific band light source) to the second optical waveguide 103. The light source reserved in the first optical waveguide 102 is a non-primary band light source (for example, a second specific band light source), which is transmitted by the first optical waveguide 102, sequentially passes the third featured region 109 and the fourth featured region 110 and the fifth featured region 111 after completing the band filtering and light splitting, and finally output by the first optical waveguide 102 at the second side of the optical substrate 101.

Next, the band filtering structure 105 completes the band filtering, and the light source guided from the first optical waveguide 102 to the second optical waveguide 103 is the main band light source, which is continuously transmitted to the third featured region 109 by the second optical waveguide 103. The transmission of the light source in the second optical waveguide 103 of the third featured region 109 is an optical waveguide transmission without waveguide coupling process, so it can effectively help to stabilize the optical waveguide mode of the main band light source.

Next, the light source is transferred to the fourth featured region 110 via the second optical waveguide 103, and the polarization filtering structure 106 will direct the main band light source of a specific polarization direction (for example, the polarization light source of transverse electric of the first specific band) from the second optical waveguide 103 to the third optical waveguide 104. The second optical waveguide 103 leaves a main band light source with another specific polarization direction (for example, a light source of a transverse magnetic of the first specific band). Then, after the polarization filtering and light splitting is completed, the main band light sources with the different polarization directions are respectively transmitted by the second optical waveguide 103 and the third optical waveguide 104, and then are output at the fifth featured region 111.

Figure 2:
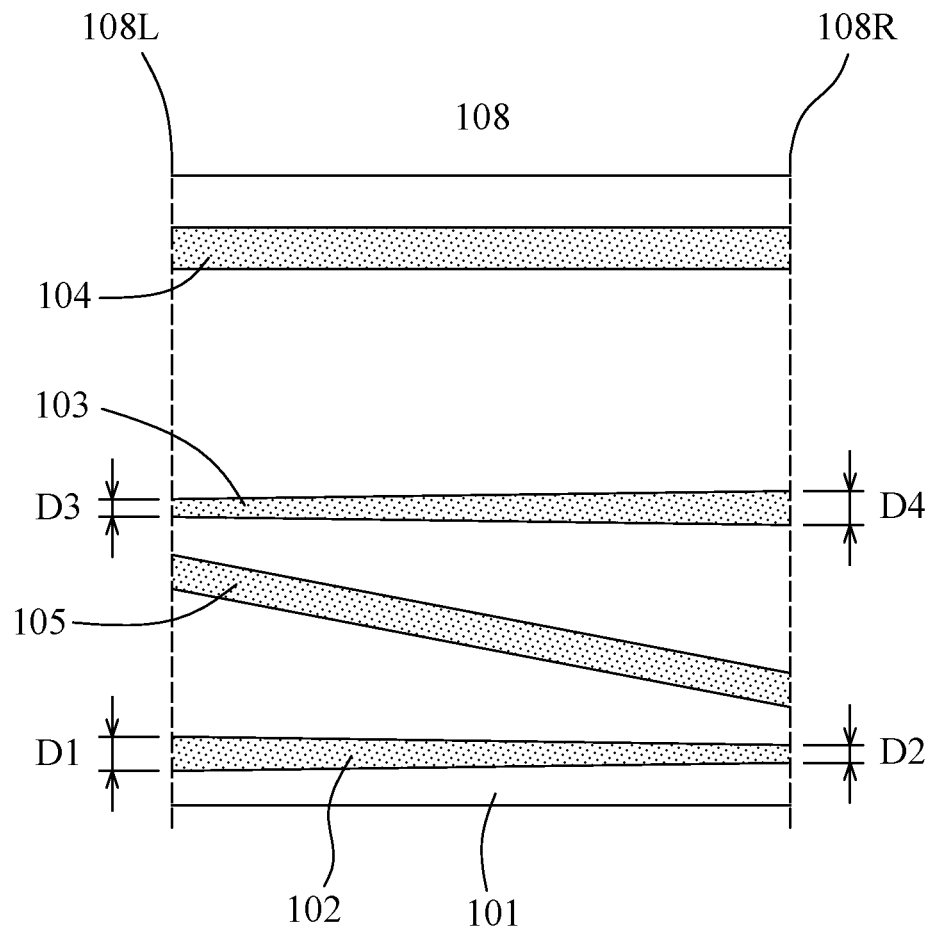
FIG. 2 is a schematic enlarged diagram showing a structure of a second featured region of an asymmetric adiabatic polarization beam splitter in an integrated optical waveguide filtering chip according to one embodiment of the present disclosure.
Figure 3:
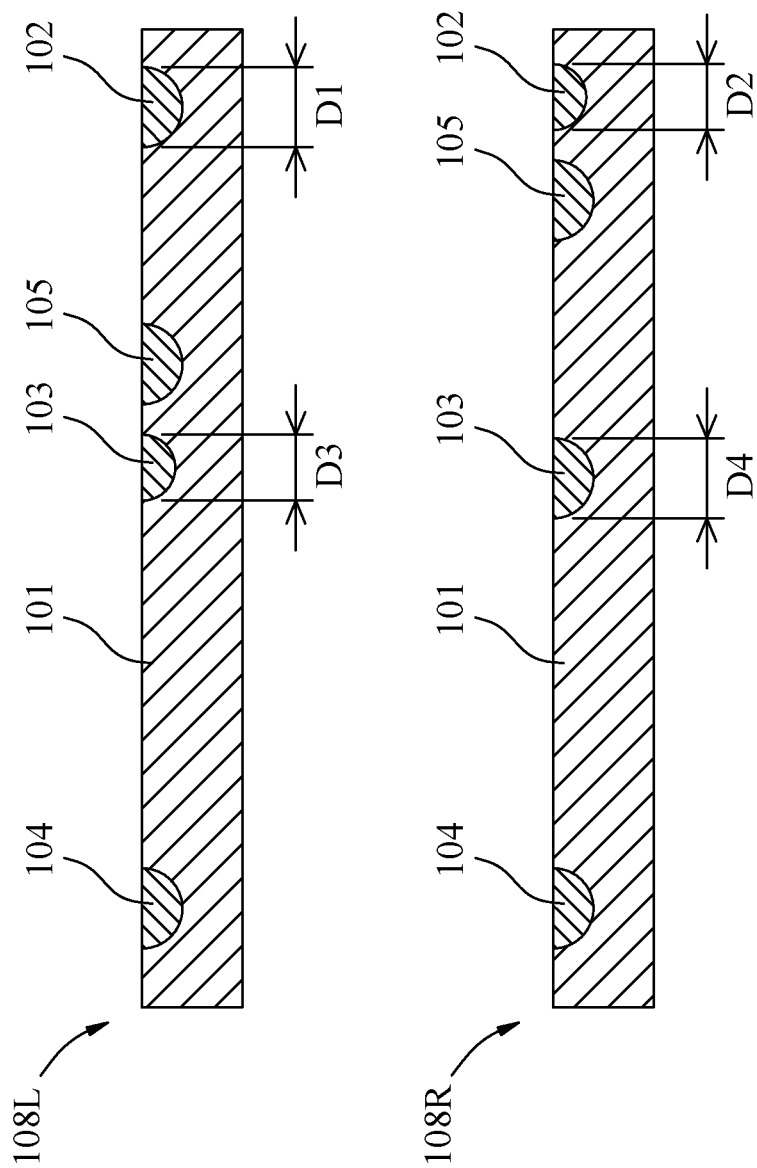
FIG. 3 is a schematic diagram showing a transverse cut profile of a second featured region of an asymmetric adiabatic polarization beam splitter in an integrated optical waveguide filtering chip according to one embodiment of the present disclosure.

Please refer to FIG. 1 through FIG. 3, wherein FIG. 2 is a schematic enlarged diagram showing a structure of a second featured region of an asymmetric adiabatic polarization beam splitter in an integrated optical waveguide filtering chip according to one embodiment of the present disclosure, and FIG. 3 FIG. 3 is a schematic diagram showing a transverse cut profile of a second featured region of an asymmetric adiabatic polarization beam splitter in an integrated optical waveguide filtering chip according to one embodiment of the present disclosure.

The second featured region 108 is one of the main working regions of the asymmetric adiabatic polarization beam splitter 1. On the optical substrate 101 of the second featured region 108, the light source enters from the boundary 108L of the second featured region 108 through the first optical waveguide 102 of the second featured region 108. In the transmission process of the band filtering and light splitting, the band filtering structure 105 adjusts the coupling coefficient between the first optical waveguide 102 and the band filtering structure 105 of the second featured region, and adjusts the coupling coefficient between the second optical waveguide 103 and the band filtering structure 105 of the second featured region, wherein the band filtering waveguide is implemented by a single-channel band filtering waveguide, and can be a channel waveguide, a diffused waveguide, a ridge waveguide or a buried waveguide, and the present disclosure is not limited thereto. The waveguide 102 is coupled to the second optical waveguide 103 of the second featured region 108, and is output by the boundary 108R of the second featured region 108, thereby completing the band filtering and light splitting.

The optical substrate 101 in the second featured region 108 must be selected as a dispersive optical material to have different optical refractive indices correspondingly for different band light sources, so as to utilize the coupling effect between the optical waveguides to realize the waveband filtering splitter unit. Therefore, the optical substrate 101 can be a silicon-based material substrate, a III-V material substrate, a silicon substrate, a sapphire substrate, a ceramic substrate, a quartz substrate, or a nonlinear optical material substrate, such as a lithium niobate substrate, a lithium tantalate substrate, or a potassium titanyl phosphate substrate.

The first optical waveguide 102, the second optical waveguide 103 and the third optical waveguide 104 of the second featured region 108 are parallel to each other and keep a distance, so that the first optical waveguide 102, the second optical waveguide 103 and the third optical waveguide 104 of the second featured region 108 tend to have a nearly zero mutual optical waveguide coupling effect.

In the boundary 108L of the second featured region 108, the first optical waveguide 102 and the band filtering structure 105 of the second featured region 108 are separated by a long distance, and the coupling effect between the two optical waveguides is weak. The first optical waveguide 102 gradually approaches the band filtering structure 105 in an extending direction from the first side to the second side, so that the coupling effect between the two is gradually enhanced in the extending direction. In the boundary 108R of the second featured region 108, the first optical waveguide 102 and the band filtering structure 105 of the second featured region 108 are separated by the closest distance, so that the coupling effect between the two can reach the highest value.

In the boundary 108L of the second featured region 108, the second optical waveguide 103 of the boundary 108L of the second featured region 108 and the band filtering structure 105 are separated by a relatively short distance. At this time, the second optical waveguide 103 of the second featured region 108 and the band filtering structure 105 have a strong coupling effect. The band filtering structure 105 gradually moves away from the second optical waveguide 103 of the second featured region 108 in the extending direction from the first side to the second side, so that the coupling effect between the two is gradually weakened. In the boundary 108R of the second featured region 108, the second optical waveguide 103 and the band filtering structure 105 of the second featured region 108 are the farthest apart away from each other, so that the coupling effect between the two is the lowest.

The first optical waveguide 102 of the second featured region 108 has a tapered structure, and the waveguide width in the second featured region 108 gradually narrows as the transmission distance is increased, so as to assist in adjusting the coupling effect between the first optical waveguide 102 of the region 108 and the band filtering structure 105 of the band filtering and light splitting during the transmission process. In other words, the waveguide widths of the first optical waveguide 102 in the second featured region 108 in the boundary 108L and 108R are D1 and D2, respectively, wherein D2 is smaller than D1, and D2 is not 0.

The second optical waveguide 103 of the second featured region 108 is a reverse tapered structure, and the waveguide width in the second featured region 108 gradually widens with the transmission distance to assist in adjusting the coupling effect between the second optical waveguide 103 of the second featured region 108 and the band filtering structure 105 of the band filtering and light splitting during the transmission process. In other words, the waveguide widths of the second optical waveguide 103 of the second featured region 108 in the boundary 108L and 108R are D3 and D4, respectively, D3 is smaller than D4, and D3 is not 0.

In the transfer process, the coupling conditions between the optical waveguides are arranged and designed by a variety of optical waveguide geometric structures, thereby completing STIRAP, which satisfies the adiabatic conversion process and achieves low loss polarization filtering and light splitting. The details and the principle can refer to "Adiabatic light transfer in titanium diffused lithium niobate waveguides", Chung, H. P., et al., Optics express 23.24 (2015): 30641-30650. The content of the literature will not be repeated herein.

Figure 4:
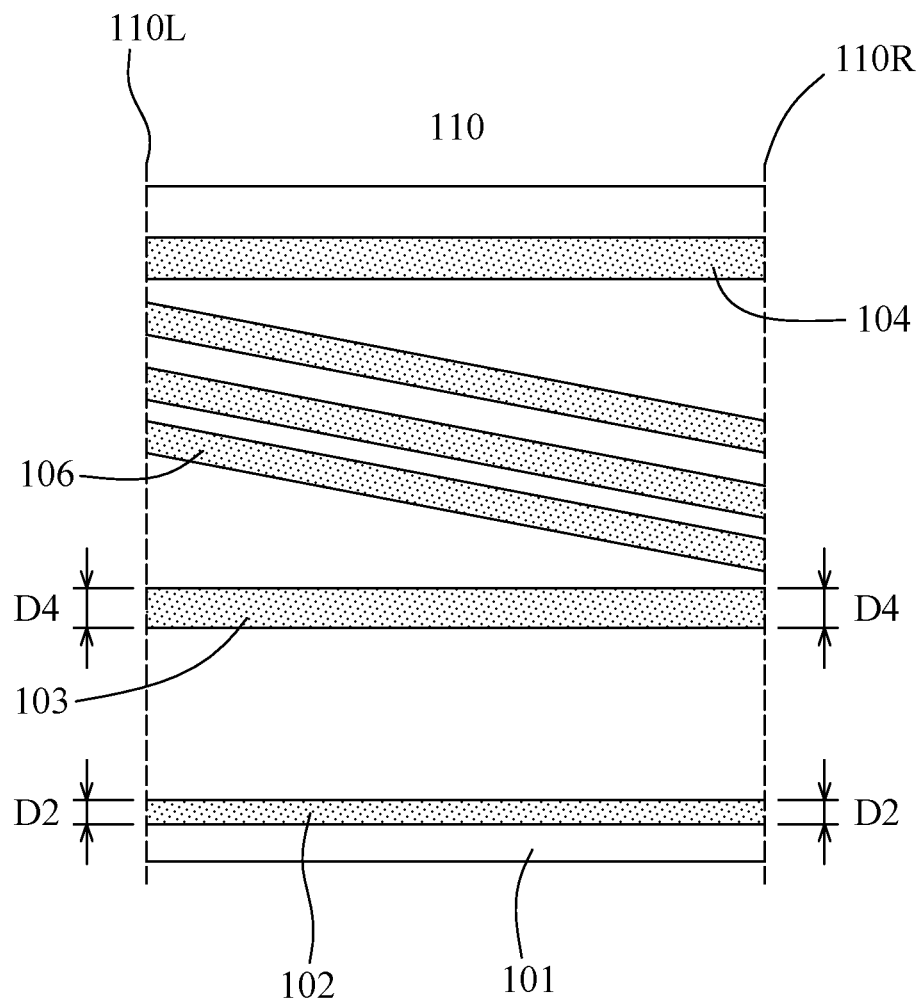
FIG. 4 is a schematic enlarged diagram showing a structure of a fourth featured region of an asymmetric adiabatic polarization beam splitter in an integrated optical waveguide filtering chip according to one embodiment of the present disclosure.
Figure 5:
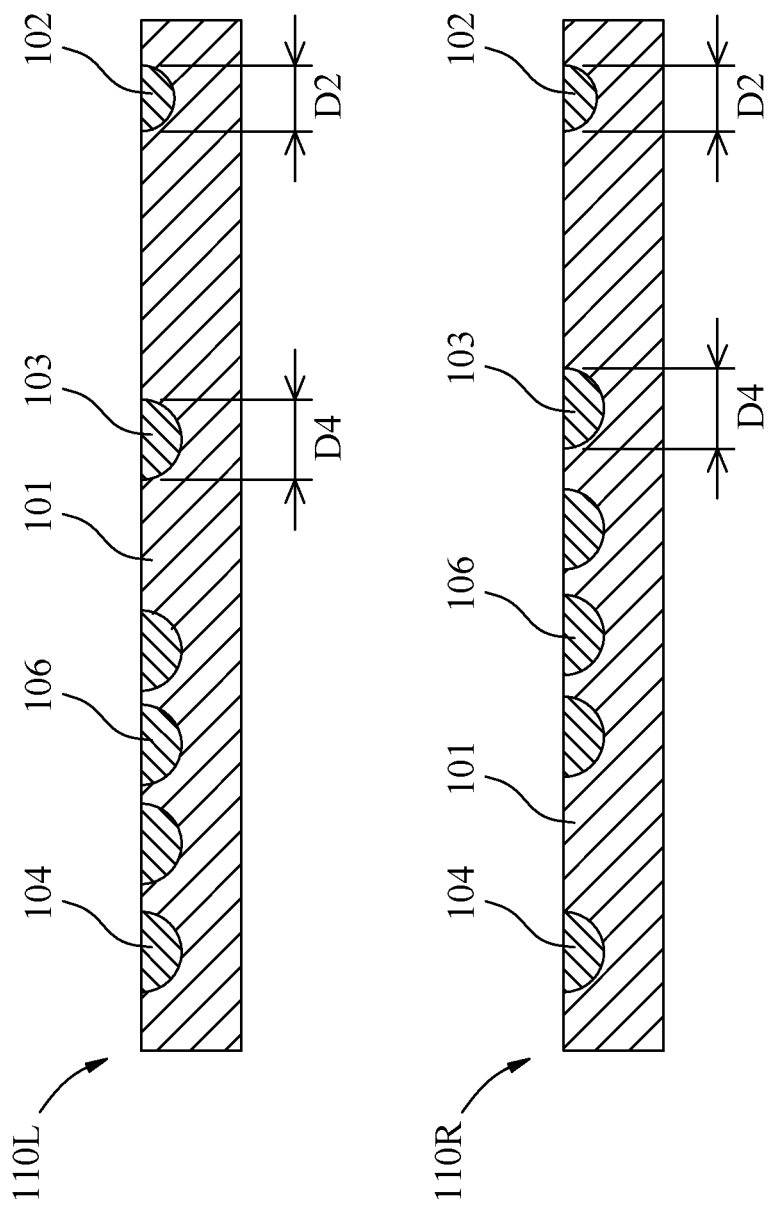
FIG. 5 is a schematic diagram showing a transverse cut profile of a fourth featured region of an asymmetric adiabatic polarization beam splitter in an integrated optical waveguide filtering chip according to one embodiment of the present disclosure.

Please refer to FIG. 1, FIG. 4 and FIG. 5, wherein FIG. 4 is a schematic enlarged diagram showing a structure of a fourth featured region of an asymmetric adiabatic polarization beam splitter in an integrated optical waveguide filtering chip according to one embodiment of the present disclosure, and FIG. 5 is a schematic diagram showing a transverse cut profile of a fourth featured region of an asymmetric adiabatic polarization beam splitter in an integrated optical waveguide filtering chip according to one embodiment of the present disclosure.

The fourth featured region 110 is another main working region of the asymmetric adiabatic polarization beam splitter 1. In the optical substrate 101 of the fourth featured region 110, the light source enters from the boundary 110L of the fourth featured region 110 through the second optical waveguide 103 of the fourth featured region 110. In the transmission process of polarization filtering and light splitting, the polarization filtering structure 106 is used to adjust the coupling coefficient between the second optical waveguide 103 of the fourth featured region 110 and the polarization filtering structure 106, and to adjust the coupling coefficient between the third optical waveguide 104 of the fourth featured region 110 and the polarization filtering structure 106, the specific polarization light source can be coupled to the third optical waveguide 104 of the fourth featured region 110 and output by the boundary 110R of the fourth featured region 110 to complete the polarization filtering and light splitting. The polarization filtering structure 106 is realized by a polarization filtering waveguide array, such as three or five polarization filtering waveguides, preferably three polarization filtering waveguides. The polarization spatial filtering waveguides can be channel waveguides, diffuse waveguides, ridge waveguides or buried waveguide, and the present disclosure is not limited to this.

The optical substrate 101 of the fourth featured region 110 must be a birefringent optical material, or the waveguide geometry must be used to provide different optical refractive indices for light sources of different polarizations, so as to utilize the coupling effect between the optical waveguides to realize the polarization filtering and light splitting. In addition, the first optical waveguide 102, the second optical waveguide 103, and the third optical waveguide 104 of the fourth featured region 110 are parallel to each other and keep a distance, so that the coupling effect of the optical waveguide among the three is close to zero.

In the boundary 110L of the fourth featured region 110, the second optical waveguide 103 and the polarization filtering structure 106 of the fourth featured region 110 are separated by a long distance, and the coupling effect between the two optical waveguides is weak, but with the direction of the transmission distance, i.e. from the boundary 110L to the boundary 110R, the distance between the second optical waveguide 103 of the fourth featured region 110 and the polarization filtering structure 106 gradually decreases, which enhances the coupling effect between the two. In the boundary 110R of the fourth featured region 110, the distance between second optical waveguide 103 of the fourth featured region 110 and the polarization filtering structure 106 is smallest, which makes the coupling effect of the two reach the highest value.

In the boundary 110L of the fourth feature area 110, the third optical waveguide 104 and the polarization filtering structure 106 of the fourth feature area 110 are separated by a relatively close distance. At this time, the third optical waveguide 104 and the polarization filtering structure 106 of the fourth feature area 110 have a strong coupling effect. With the direction of the transmission distance, the polarization filtering structure 106 gradually moves away from the third optical waveguide 104 of the fourth feature area 110, so that the coupling effect between the two is gradually weakened. At the exit of the boundary 110R of the fourth featured region 110, the third optical waveguide 104 of the fourth featured region 110 and the polarization filtering structure 106 are separated by the farthest distance, so that the coupling effect between the two is the lowest.

In the transfer process, the coupling conditions between the optical waveguides are arranged and designed by a variety of optical waveguide geometric structures, thereby completing STIRAP, which satisfies the adiabatic conversion process and achieves low loss polarization filtering and light splitting. The details and the principle can refer to "Broadband on-chip polarization mode splitters in lithium niobate integrated adiabatic couplers", Chung, Hung-Pin, et al., Optics express 27.2 (2019): 1632-1645. The content of the literature will not be repeated herein.

Figure 6:
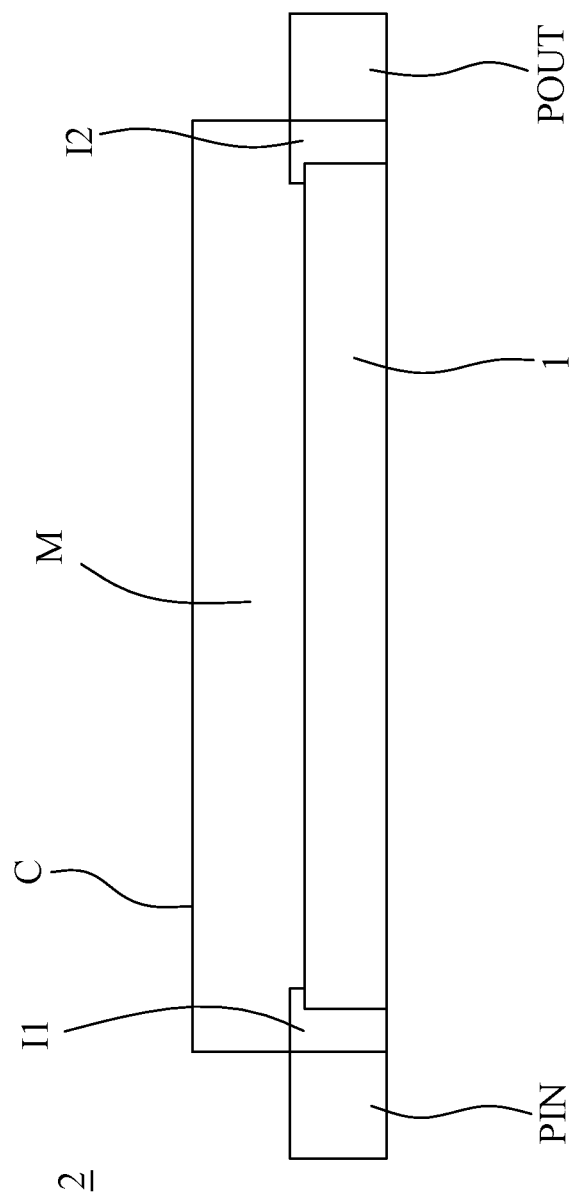
FIG. 6 is a schematic diagram showing a structure of an integrated optical waveguide filtering chip according to one embodiment of the present disclosure.

In addition, refer to FIG. 6, and FIG. 6 is a schematic diagram showing a structure of an integrated optical waveguide filtering chip according to one embodiment of the present disclosure. The asymmetric adiabatic polarization beam splitter 1 is an integrated optical die, and its first side and second side can be joined to fiber interfaces I1 and I2 respectively. The fiber interfaces I1 and I2 can be connected to the fiber connector modules PIN and POUT respectively. Through the coverage of packaging material M and housing C, an integrated optical waveguide filtering chip 2 can be formed finally. Simply put, the packaging structure composed of the fiber interfaces I1, I2, the fiber connector modules PIN, POUT, packaging material M and the housing C can be used to package the asymmetric adiabatic polarization beam splitter 1 to form an integrated optical waveguide filtering chip 2.

It can be seen from the above descriptions that compared with the existing documents, the present disclosure adopts a special series connection combination design, specializes the function of each filtering unit, and configure the waveguide configuration to split the light sources of the main band and the non-main band into different ways, which is effective to reduce noise interference. The design of the present disclosure can also to be serially connected with multiple filtering units to greatly improve the functional characteristics of filtering of the integrated optical die, thus achieving the purpose of mass production of the high-performance integrated optical waveguide filtering chip.

Various modifications and changes may be made as would be obvious to a person skilled in the art having the benefit of this disclosure. It is intended to embrace all such modifications and changes and, accordingly, the above descriptions to be regarded in an illustrative rather than a restrictive sense.

What is claimed is:

1. An asymmetric adiabatic polarization beam splitter, comprising:
    an optical substrate, having a first side, a second side opposite to the first side, a third side and a fourth side opposite to the third side, wherein the third side and the fourth side are adjacent to the first side and the second side, and from the first side to the second side, sequentially having a first featured region, a second featured region, a third featured region, a fourth featured region and a fifth featured region;
    a first optical waveguide, a second optical waveguide and a third optical waveguide, formed on the optical substrate and extend from the first side to the second side, wherein from the third side to the fourth side, there are sequentially the first optical waveguide, the second optical waveguide and the third optical waveguide;
    a band filtering structure, formed on the optical substrate, located in the second featured region and between the first optical waveguide and the second optical waveguide, used to guide a first specific band light source in the first optical waveguide into the second optical waveguide; and a polarization filtering structure, formed on the optical substrate, located in the fourth featured region and between the second optical waveguide and the third optical waveguide, used to guide a first polarization direction light source in the second optical waveguide into the third optical waveguide.

2. The asymmetric adiabatic polarization beam splitter of claim 1, wherein the first optical waveguide, the second optical waveguide and the third optical waveguide are arranged in parallel with each other.

3. The asymmetric adiabatic polarization beam splitter of claim 1, wherein the optical substrate is a silicon-based material substrate, a III-V material substrate, a silicon substrate, a sapphire substrate, a ceramic substrate, a quartz substrate, a lithium niobate substrate, a lithium tantalate substrate or a potassium titanyl phosphate substrate.

4. The asymmetric adiabatic polarization beam splitter of claim 1, wherein each of the first optical waveguide, the second optical waveguide and the third optical waveguide is a channel waveguide, a diffused waveguide, a ridge waveguide or a buried waveguide.

5. The asymmetric adiabatic polarization beam splitter of claim 1, wherein the first featured region is a transition buffer region before a light source of the first optical waveguide enters the second featured region, the third featured region is used to help stabilize the optical waveguide mode of the first specific band light source in the second optical waveguide, and the fifth featured region is used to make a second specific band light source of the first optical waveguide, a second polarization direction light source of the second optical waveguide and the first polarization direction light source of third optical waveguide output outside.

6. The asymmetric adiabatic polarization beam splitter of claim 1, wherein the first optical waveguide in the second featured region has a tapered structure with a waveguide width being gradually decreased in an extending direction from the first side to the second side, and the second optical waveguide in the second featured region is a reverse tapered structure with a waveguide width being gradually increased in the extending direction from the first side to the second side.

7. The asymmetric adiabatic polarization beam splitter of claim 1, wherein the band filtering structure is a band filtering waveguide, the band filtering waveguide is a channel waveguide, a diffused waveguide, a ridge waveguide or a buried waveguide, and the band filtering structure gradually departs away from the second optical waveguide and gradually approaches the first optical waveguide in an extending direction from the first side to the second side.

8. The asymmetric adiabatic polarization beam splitter of claim 1, wherein the polarization filtering structure comprises at least three polarization filtering waveguides, the polarization filtering waveguide is a channel waveguide, a diffused waveguide, a ridge waveguide or a buried waveguide, and the polarization filtering structure gradually departs away from the third optical waveguide and gradually approaches the second optical waveguide in an extending direction from the first side to the second side.

9. The asymmetric adiabatic polarization beam splitter of claim 1, wherein the first polarization direction light source is a polarization light source of transverse electric.

10. An integrated optical waveguide filtering chip, comprising:
    an asymmetric adiabatic polarization beam splitter; and
    a packaging structure, used to package the asymmetric adiabatic polarization beam splitter to form the integrated optical waveguide filtering chip, wherein the asymmetric adiabatic polarization beam splitter comprises:
    an optical substrate, having a first side, a second side opposite to the first side, a third side and a fourth side opposite to the third side, wherein the third side and the fourth side are adjacent to the first side and the second side, and from the first side to the second side, sequentially having a first featured region, a second featured region, a third featured region, a fourth featured region and a fifth featured region;
    a first optical waveguide, a second optical waveguide and a third optical waveguide, formed on the optical substrate and extend from the first side to the second side, wherein from the third side to the fourth side, there are sequentially the first optical waveguide, the second optical waveguide and the third optical waveguide;
    a band filtering structure, formed on the optical substrate, located in the second featured region and between the first optical waveguide and the second optical waveguide, used to guide a first specific band light source in the first optical waveguide into the second optical waveguide, wherein the first specific band light source is a light source of a first specific band; and a polarization filtering structure, formed on the optical substrate, located in the fourth featured region and between the second optical waveguide and the third optical waveguide, used to guide a first polarization direction light source in the second optical waveguide into the third optical waveguide.

11. The integrated optical waveguide filtering chip of claim 10, wherein the first optical waveguide, the second optical waveguide and the third optical waveguide are arranged in parallel with each other.

12. The integrated optical waveguide filtering chip of claim 10, wherein the optical substrate is a silicon-based material substrate, a III-V material substrate, a silicon substrate, a sapphire substrate, a ceramic substrate, a quartz substrate, a lithium niobate substrate, a lithium tantalate substrate or a potassium titanyl phosphate substrate.

13. The integrated optical waveguide filtering chip of claim 10, wherein each of the first optical waveguide, the second optical waveguide and the third optical waveguide is a channel waveguide, a diffused waveguide, a ridge waveguide or a buried waveguide.

14. The integrated optical waveguide filtering chip of claim 10, wherein the first featured region is a transition buffer region before a light source of the first optical waveguide enters the second featured region, the third featured region is used to help stabilize the optical waveguide mode of the first specific band light source in the second optical waveguide, and the fifth featured region is used to make a second specific band light source of the first optical waveguide, a second polarization direction light source of the second optical waveguide and the first polarization direction light source of third optical waveguide output outside.

15. The integrated optical waveguide filtering chip of claim 10, wherein the first optical waveguide in the second featured region has a tapered structure with a waveguide width being gradually decreased in an extending direction from the first side to the second side, and the second optical waveguide in the second featured region is a reverse tapered structure with a waveguide width being gradually increased in the extending direction from the first side to the second side.

16. The integrated optical waveguide filtering chip of claim 10, wherein the band filtering structure is a band filtering waveguide, the band filtering waveguide is a channel waveguide, a diffused waveguide, a ridge waveguide or a buried waveguide, and the band filtering structure gradually departs away from the second optical waveguide and gradually approaches the first optical waveguide in an extending direction from the first side to the second side.

17. The integrated optical waveguide filtering chip of claim 10, wherein the polarization filtering structure comprises at least three polarization filtering waveguides, the polarization filtering waveguide is a channel waveguide, a diffused waveguide, a ridge waveguide or a buried waveguide, and the polarization filtering structure gradually departs away from the third optical waveguide and gradually approaches the second optical waveguide in an extending direction from the first side to the second side.

18. The integrated optical waveguide filtering chip of claim 10, wherein the first polarization direction light source is a polarization light source of transverse electric.

* * * * *